(12) United States Patent
Hara et al.

(10) Patent No.: US 7,209,425 B2
(45) Date of Patent: Apr. 24, 2007

(54) DRIVE APPARATUS FOR TAPE-LIKE OPTICAL RECORDING MEDIUM

(75) Inventors: Masaaki Hara, Tokyo (JP); Jun Sawai, Kanagawa (JP); Yujiro Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 10/489,743

(22) PCT Filed: Jul. 14, 2003

(86) PCT No.: PCT/JP03/08894

§ 371 (c)(1),
(2), (4) Date: Mar. 15, 2004

(87) PCT Pub. No.: WO2004/008454

PCT Pub. Date: Jan. 22, 2004

(65) Prior Publication Data
US 2004/0233820 A1    Nov. 25, 2004

(30) Foreign Application Priority Data
Jul. 17, 2002  (JP) .............................. 2002-207885

(51) Int. Cl.
G11B 7/00  (2006.01)
(52) U.S. Cl. ................... 369/97; 369/93; 369/44.14
(58) Field of Classification Search .................... None
See application file for complete search history.

(56) References Cited
U.S. PATENT DOCUMENTS 5,369,631 A    11/1994    Hwang
5,777,823 A    7/1998    Gavit
7,029,726 B1 *    4/2006    Chen et al. .................. 427/555

FOREIGN PATENT DOCUMENTS

| JP | 62-229565 | 10/1987 |
| JP | 1-143088 | 6/1989 |
| JP | 1-159220 | 11/1989 |
| JP | 3-23516 | 1/1991 |

* cited by examiner

Primary Examiner—Muhammad Edun
(74) Attorney, Agent, or Firm—Frommer Lawrence Haug LLP; William S. Frommer

(57) ABSTRACT

An apparatus for driving a tape-shaped optical recording medium, which comprises a supply reel (41) for supplying an optical tape (40), a take-up reel (42) for taking-up the optical tape (40), a friction capstan (43) for driving the optical tape (40) to run to the take-up reel (42) from the supply reel (41) and a running guide member (46) for guiding the optical tape (40) running between the supply reel (41) and the take-up reel (42). The running guide member (46) has a flat portion forming a guide face portion (70) for facing to the optical tape (40) is operative to cause the optical tape (40) to run along the flat portion. Thereby, an area on the guide face portion (70) of the running guide member (46) where an incident position on the optical tape (40) of a light beam is fixed invariably can be stably maintained to be relatively wide.

9 Claims, 13 Drawing Sheets

DRIVE APPARATUS FOR TAPE-LIKE OPTICAL RECORDING MEDIUM

TECHNICAL FIELD

The invention disclosed in each of claims of the present application relates to an apparatus for driving a tape-shaped optical recording medium on which information is recorded by a light beam incident thereupon or from which recorded information is read by a light beam incident thereupon.

TECHNICAL BACKGROUND

In the field of information recording on a recording medium and information reproduction from a recording medium on which the information is recorded, under the circumstances wherein recording and reproduction of data representing moving pictures performed with a relatively small-scale recording and reproducing instrument are desired, it is strongly required more than before to have arrangements for recording information on a recording medium with high data density, increasing data rate of information to be recorded on or reproduced from a recording medium and so on. Accordingly, with the intention of meeting such requirements, there has been proposed an optical recording and reproducing technology for causing a single or a plurality of light beams to be incident upon an optical recording medium on which information can be recorded with light so as to record information on the optical recording medium and to reproduce information from the optical recording medium on which the information is recorded.

With the optical recording and reproducing technology, in addition to the advantage that noncontact information recording wherein information is subjected to noncontact recording on an optical recording medium or noncontact information reproduction wherein information recorded on an optical recording medium is subjected to noncontact reproduction from the optical recording medium is carried out, further advantages that a laser light beam is used for recording information on an optical recording medium so that the information is recorded with high data density on the optical recording medium and a plurality of independent laser light beams are used for recording information on and reproducing the information from an optical recording medium so that the data rate of the information to be recorded on or reproduced from the optical recording medium is increased, are obtained. As one of information recording and reproducing apparatus, to each of which such optical recording and reproducing technology as mentioned above is applied, an optical tape recording and reproducing apparatus in which a tape-shaped optical recording medium, namely, an optical tape is used, has been proposed as disclosed in the paper of "Novel digital optical tape recorder", Oakley, William S., LaserTape Inc., SPIE Proceedings Vol. 2604, pp. 256–262.

FIG. 1 shows a light beam controlling and signal processing portion of an example of the optical tape recording and reproducing apparatus proposed previously. In the light beam controlling and signal processing portion shown in FIG. 1, a laser light source 1 is provided for generating continuously a single laser light beam as a parallel light beam. The single laser light beam emitted from the laser light source 1 enters into a beam producing hologram 2.

In the beam producing hologram 2, the single laser light beam which is the parallel light beam emitted from the laser light source 1 is divided into a plurality of laser light beams each being a parallel light beam. That is, the beam producing hologram 2 is operative to produce a plurality of parallel light beams by dividing the single parallel light beam.

The laser light beams obtained from the beam producing hologram 2 enter into a polarized light beam splitter 3 and are reflected from the polarized light beam splitter 3 to be directed downward in FIG. 1 to pass through a quarter wavelength plate 4 and then enter into a converging lens 5. The converging lens 5 is operative to converge the laser light beams having passed through the quarter wavelength plate 4 on a two-dimensional light-modulator 6.

The two-dimensional light-modulator 6 is constituted with a plurality of reflection type light-modulating elements which are arranged two-dimensionally with predetermined spaces. The laser light beams converged by the converging lens 5 come respectively to the reflection type light-modulating elements so arranged two-dimensionally as to form the two-dimensional light-modulator 6. A back surface of each of the reflection type light-modulating elements, which is opposite to an incident surface of the reflection type light-modulator upon which one of the laser light beams is incident, forms a light reflector. Therefore, the laser light beam incident upon each of the reflection type light-modulating elements is reflected from the light reflector in the form of the back surface of the reflection type light-modulator.

In relation to the two-dimensional light-modulator 6, a modulation control signal generator 7 is provided. The modulation control signal generator 7 is operative to produce a plurality of modulation control signals SM corresponding to information which are to be recorded and supply the reflection type light-modulating elements constituting the two-dimensional light-modulator 6 with the modulation control signals SM, respectively. Each of the reflection type light-modulating elements constituting the two-dimensional light-modulator 6 is operative to modulate the laser light beam which is incident thereupon and reflected therefrom in response to the modulation control signal SM. The modulation of the laser light beam in the two-dimensional light-modulator 6 is carried out by varying the reflection amount of the laser light beam at each of the reflection type light-modulating elements in response to the modulation control signal SM. Incidentally, if the modulation control signals SM require, the laser light beam which is incident upon each of the reflection type light-modulating elements constituting the two-dimensional light-modulator 6 is reflected from the reflection type light-modulating elements substantially without being modulated.

As a result of this, the laser light beams which are modulated in response to the modulation control signals SM at and reflected from the reflection type light-modulating elements arranged two-dimensionally with predetermined spaces, respectively, or reflected respectively from the reflection type light-modulating elements arranged two-dimensionally with predetermined spaces substantially without being modulated, are obtained from the two-dimensional light-modulator 6 to be directed to the converging lens 5.

The laser light beams from the two-dimensional light-modulator 6 pass through the converging lens 5 and the quarter wavelength plate 4 to enter into the polarized light beam splitter 3. Since the laser light beams entering into the polarized light beam splitter 3 from the quarter wavelength plate 4 have passed through the quarter wavelength plate 4 twice in the direction to the converging lens 5 and in the opposite direction to the polarized light beam splitter 3, a plane of polarization of each of the laser light beams entering into the polarized light beam splitter 3 from the quarter wavelength plate 4 has been rotated by 90 degrees in comparison with that of each of the laser light beams entering into the polarized light beam splitter 3 from the beam producing hologram 2 and therefore the laser light beams entering into the polarized light beam splitter 3 from the quarter wavelength plate 4 pass through the polarized light beam splitter 3 without being reflected.

The laser light beams thus having passed through the polarized light beam splitter 3 further pass through a quarter wavelength plate 8 and a light beam control optical system 9 to be incident upon an optical tape 10 which is an optical recording medium. The light beam control optical system 9 is operative to subject each of the laser light beams passing through there to the optical tape 10 to focus control for focusing properly each of the laser light beams on the optical tape 10 and tracking control for causing each of the laser light beams to be incident upon a proper position on the optical tape 10. Further, the optical tape 10 is driven by an optical tape driving device not shown in FIG. 1 to run in the direction indicated with an allow T (hereinafter, referred to as the T direction).

With the movement of the optical tape 10 in the T direction, a plurality of recording tracks, on each of which information is recorded, are formed on the optical tape 10 along the moving direction of the optical tape 10.

When the laser light beams which have been reflected without being modulated from the two-dimensional light-modulator 6 are incident upon the optical tape 10, these laser light beams are modulated in response to information recorded on the optical tape 10 and simultaneously reflected from the optical tape 10 to be directed to the light beam control optical system 9. The laser light beams obtained from the optical tape 10 pass through the light beam control optical system 9 and the quarter wavelength plate 8 and then enter into the polarized light beam splitter 3. Since the laser light beams entering into the polarized light beam splitter 3 from the quarter wavelength plate 8 have passed through the quarter wavelength plate 8 twice in the direction to the light beam control optical system 9 and in the opposite direction to the polarized light beam splitter 3, a plane of polarization of each of the laser light beams entering into the polarized light beam splitter 3 from the quarter wavelength plate 8 has been rotated by 90 degrees in comparison with that of each of the laser light beams entering into the polarized light beam splitter 3 from the quarter wavelength plate 4 and therefore the laser light beams entering into the polarized light beam splitter 3 from the quarter wavelength plate 8 are reflected from the polarized light beam splitter 3 to be directed to the right in FIG. 1.

The laser light beams reflected to the right in FIG. 1 from the polarized light beam splitter 3 enter into a light beam splitter 11. A part of each of the laser light beams having entered into the light beam splitter 11 is reflected from the light beam splitter 11 to be directed downward in FIG. 1 to pass through an optical element 12, such as a cylindrical lens or the like, and then enters into a focus and tracking detector 13 and another part of each of the laser light beams having entered into the light beam splitter 11 passes through the light beam splitter 11 further to pass through an optical element 14, such as a converging lens or the like, and then enters into a light detector 15.

The focus and tracking detector 13 is operative to produce output signals SF and ST which represent respectively the focus condition and the tracking condition of the laser light beams incident upon the optical tape 10 in response to the laser light beams incident upon the focus and tracking detector 13 through the optical element 12. The output signals SF and ST thus obtained from the focus and tracking detector 13 are used for focus control and tracking control to which each of the laser light beams to be incident upon the optical tape 10 is subjected in the light beam control optical system 9.

The light detector 15 is operative to produce a plurality of output signals SI which vary in response to variations in each of the laser light beams incident upon the light detector 15 through the optical element 14 and supply an information reproducing portion 16 with the output signals SI. The information reproducing portion 16 is operative to reproduce the information recorded on the optical tape 10 based on the output signals SI obtained from the light detector 15.

In the optical tape recording and reproducing apparatus thus shown in FIG. 1, when information is newly recorded on the optical tape 10, the modulation control signals SM which are produced to vary in response to the information to be recorded are supplied from the modulation control signal generator 7 to the reflection type light-modulating elements constituting the two-dimensional light-modulator 6, respectively. As the result, the laser light beams which are modulated in response to the modulation control signals SM by the reflection type light-modulating elements and simultaneously reflected from the reflection type light-modulating elements are obtained from the two-dimensional light-modulator 6 to be directed to the converging lens 5.

The laser light beams modulated in response to the modulation control signals SM and obtained from the two-dimensional light-modulator 6 pass through the converging lens 5, the quarter wavelength plate 4, the polarized light beam splitter 3 and the quarter wavelength plate 8 to enter into the light beam control optical system 9 and then are subjected to the focus control and the tracking control in the light beam control optical system 9 so as to be incident upon the optical tape 10. As a result of this, the recording of the information on the optical tape 10 is carried out with the laser light beams modulated in response to the modulation control signals SM and the recording tracks, on each of which the information is recorded, are formed on the optical tape 10.

When information recorded on the optical tape 10 is reproduced from the optical tape 10 in the optical tape recording and reproducing apparatus shown in FIG. 1, the modulation control signals SM, each of which is predetermined to be constant, are supplied from the modulation control signal generator 7 to the reflection type light-modulating elements constituting the two-dimensional light-modulator 6, respectively. As the result, the laser light beams which are reflected with a constant reflecting amount without being modulated from the reflection type light-modulating elements are obtained from the two-dimensional light-modulator 6 to be directed to the converging lens 5.

The laser light beams having not been modulated and obtained from the two-dimensional light-modulator 6 pass through the converging lens 5, the quarter wavelength plate 4, the polarized light beam splitter 3 and the quarter wavelength plate 8 to enter into the light beam control optical system 9 and then are subjected to the focus control and the tracking control in the light beam control optical system 9 so as to be incident upon the optical tape 10. The laser light beams thus incident upon the optical tape 10 are modulated in response to the information recorded on the optical tape 10 and simultaneously reflected from the optical tape 10 to be directed to the light beam control optical system 9. The laser light beams modulated in response to the information recorded on the optical tape 10 and obtained from the optical tape 10 pass through the light beam control optical system 9 and the quarter wavelength plate 8 and then are reflected from the polarized light beam splitter 3 to enter into the light beam splitter 11. The laser light beams thus entering into the light beam splitter 11 are partially reflected from the light beam splitter 11 to enter into the focus and tracking detector 13 and simultaneously partially pass through the light beam splitter 11 to enter into the light detector 15 through the optical element 14.

As a result of this, the output signal SF which represents the focus condition of the laser light beams incident upon the optical tape 10 and the output signal ST which represents the tracking condition of the laser light beams incident upon the optical tape 10 are obtained from the focus and tracking detector 13 and the output signals SI which vary in response to variations in each of the laser light beams modulated in response to the information recorded on the optical tape 10 are obtained from the light detector 15 to be supplied to the information reproducing portion 16. Then, in the information reproducing portion 16, the information recorded on the optical tape 10 is reproduced based on the output signals SI obtained from the light detector 15.

The optical tape 10 on which the information is recorded or from which the information recorded thereon is reproduced in the optical tape recording and reproducing apparatus shown in FIG. 1, is driven to run by the optical tape driving device.

FIG. 2 shows an example of the optical tape driving device. In the optical tape driving device shown in FIG. 2, a supply reel 21 on which the optical tape 10 is wound to be derived therefrom and a take-up reel 22 onto which the optical tape 10 is wound are provided. The optical tape 10 between the supply reel 21 and the take-up reel 22 is driven by a friction capstan 23 to run in the T direction from the supply reel 21 to the take-up reel 22.

Further, in the optical tape driving device shown in FIG. 2, a plurality of positioning members 24, a pair of tension regulators 25 and a running guide member 26 are provided for causing the optical tape 10 driven by the friction capstan 23 to run stably though a predetermined position. The positioning members 24 determine a running path for the optical tape 10 and tension regulators 25 are operative to provide the optical tape 10 between the supply reel 21 and the take-up reel 22 with predetermined tensile force brought about by springs 27. The running guide member 26 serves for guiding the optical tape 10 so that the laser light beams obtained from a light beam controlling and signal processing portion 28, such as shown in FIG. 1, are incident upon the optical tape 10 on the running guide member 26.

As shown in FIG. 3, the running guide member 26 has a guide face portion 29 facing to the optical tape 10 and a flange portion 30 for restricting the position of the optical tape 10 running thought the guide face portion 29. The guide face portion 29 is formed into a partial cylindrical surface as shown in FIG. 4.

The main function required to be performed by the running guide member 26 in the optical tape driving device mentioned above is to maintain a space between the optical tape 10 and the guide face portion 29 to be extremely small, for example, 10 to 100 nm (nanometer) for stabilizing the position of the optical tape 10 running through the guide face portion 29 so that the incident position on the optical tape 10 of each of the laser light beams obtained from the light beam controlling and signal processing portion 28 is fixed invariably.

However, with the running guide member 26 in the optical tape driving device mentioned above, the optical tape 10 comes into concentrative contact with a portion of the guide face portion 29 which is very narrow in the T direction and extends along the width of the optical tape 10 because the guide face portion 29 is formed into the cylindrical surface as shown in FIG. 4 and therefore the space between the optical tape 10 and the guide face portion 29 which is required to be extremely small, for example, 10 to 100 nm, is formed only on the very narrow portion of the guide face portion 29. This means that an area on the guide face portion 29 where the incident position on the optical tape 10 of each of the laser light beams which are obtained from the light beam controlling and signal processing portion 28 is fixed invariably is limited to be very narrow. Further, the portion of the guide face portion 29 with which the optical tape 10 comes into concentrative contact is subjected to abrasion to be deformed and thereby it is feared that a disadvantage wherein the space between the optical tape 10 and the guide face portion 29 required to be extremely small, for example, 10 to 100 nm, is varied is brought about.

Accordingly, it is an object of the invention disclosed in each of claims of the present application to provide an apparatus for driving a tape-shaped optical recording medium which is provided with running guide means having a guide face portion for facing to a tape-shaped optical recording medium and capable of maintaining continuously a space between the tape-shaped optical recording medium and the guide face portion to be extremely small over a relatively wide area on the guide face portion and thereby is able to maintain stably an area on the guide face portion where the incident position on the tape-shaped optical recording medium of each of laser light beams obtained from a light beam controlling and signal processing portion is fixed invariably to be relatively wide.

DISCLOSURE OF THE INVENTION

According to the invention claimed in any one of claims 1 to 11 of the present application, there is provided an apparatus for driving a tape-shaped optical recording medium, which comprises a pair of reel means for supplying with a tape-shaped optical recording medium and for taking-up the tape-shaped optical recording medium, respectively, driving means for causing the tape-shaped optical recording medium to run from one of the reel means to the other of the reel means, and running guide means for guiding the tape-shaped optical recording medium running between the reel means, wherein the running guide means has a flat portion forming a guide face portion for facing to the tape-shaped optical recording medium and is operative to cause the tape-shaped optical recording medium to run along the flat portion.

In the apparatus for driving a tape-shaped optical recording medium thus constituted in accordance with the invention claimed in any one of claims 1 to 11 of the present application, since the guide face portion for facing to the tape-shaped optical recording medium is formed with the flat portion of the running guide means for guiding the tape-shaped optical recording medium running between the reel means, a space between the tape-shaped optical recording medium and the guide face portion is stably and continuously maintained to be very small over a relatively wide area on the flat portion of the running guide means. Consequently, when a light beam obtained from a light beam controlling and signal processing portion is incident upon the tape-shaped optical recording medium running between the reel means on the flat portion of the running guide means, an area on the guide face portion where an incident position on the tape-shaped optical recording medium of the light beam obtained from the light beam controlling and signal processing portion is fixed invariably can be stably maintained to be relatively wide.

As a result, when the light beam obtained from the light beam controlling and signal processing portion is incident upon the tape-shaped optical recording medium running between the reel means on the flat portion of the running guide means, a focus servo control for the light beam which requires an undesirable high speed control in response to the running of the tape-shaped optical recording medium can be unnecessary.

EMBODIMENTS MOST PREFERABLE FOR WORKING OF THE INVENTION

Figure 1:
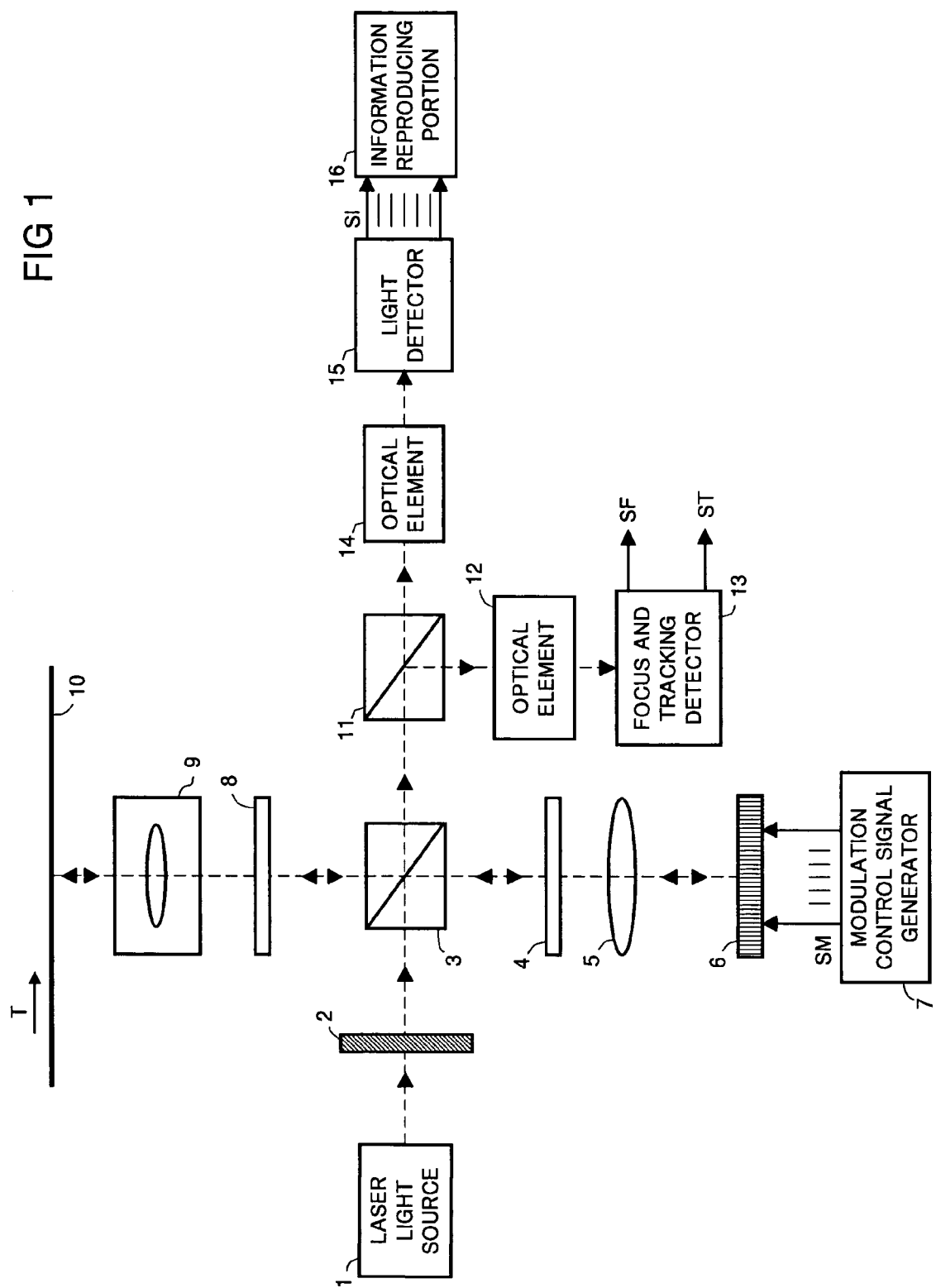
FIG. 1 is a schematic block diagram showing a light beam controlling and signal processing portion in an example of a optical tape recording and reproducing apparatus proposed previously.
Figure 2:
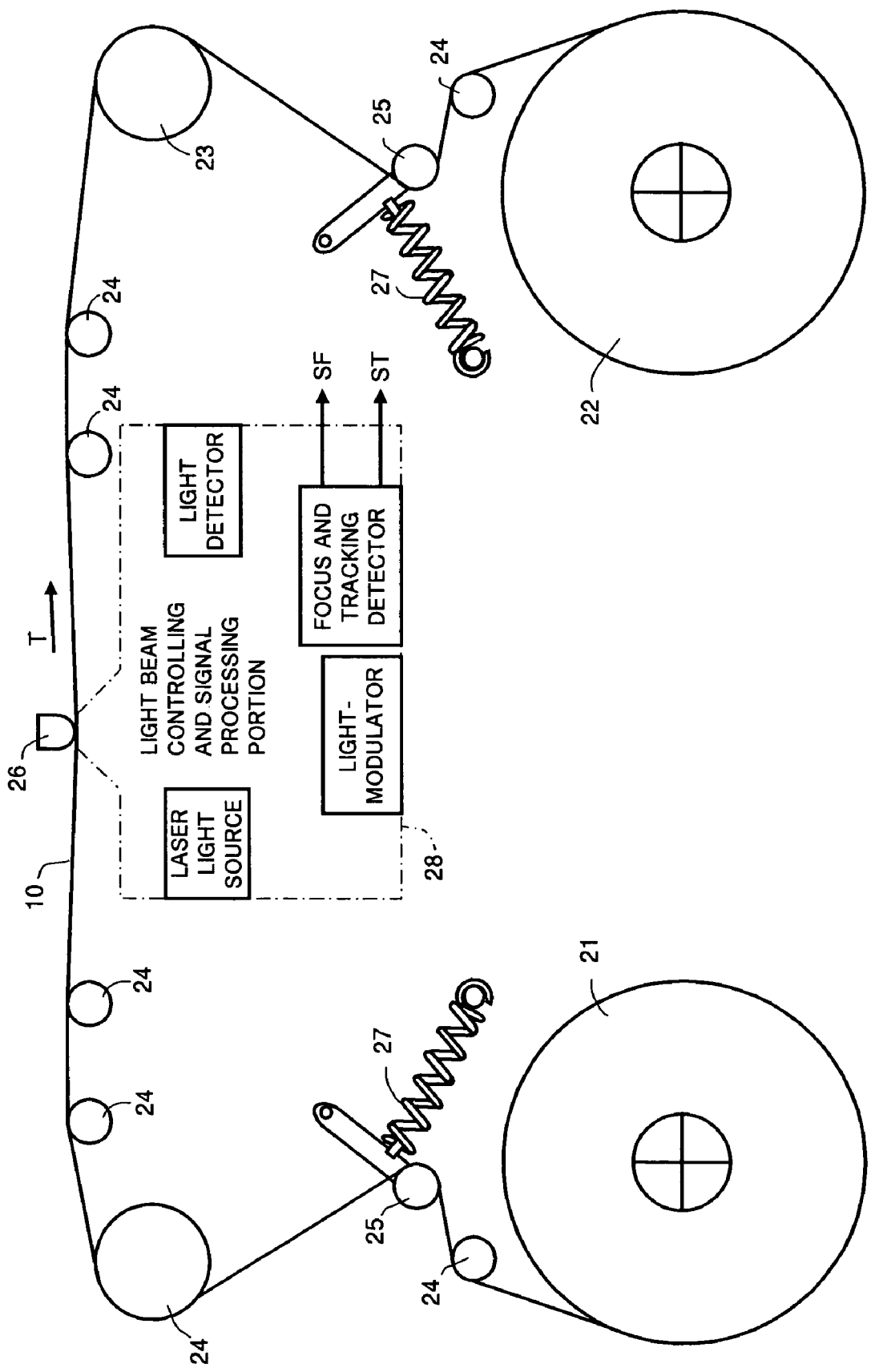
FIG. 2 is a schematic structural illustration showing an essential part of an example of an optical tape driving device for driving an optical tape on which information is recorded or from which information is reproduced by the light beam controlling and signal processing portion shown in FIG. 1.
Figure 3:
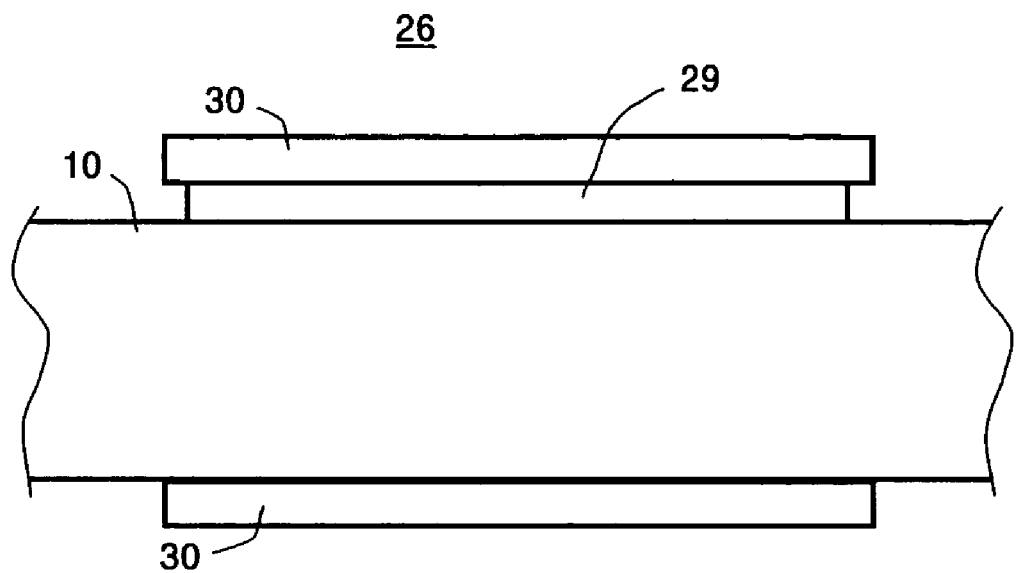
FIG. 3 is a schematic side view used for explaining a running guide member in the optical tape driving device shown in FIG. 2.
Figure 4:
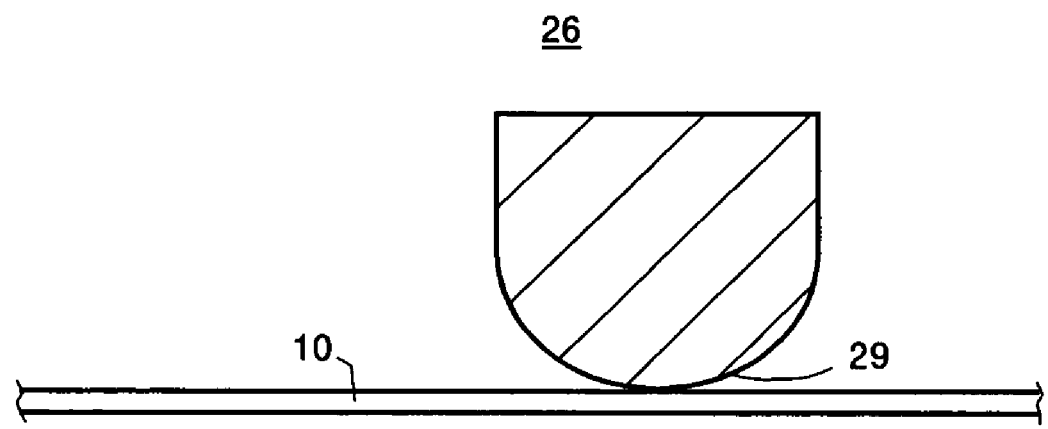
FIG. 4 is a schematic cross-sectional view used for explaining the running guide member in the optical tape driving device shown in FIG. 2.
Figure 5:
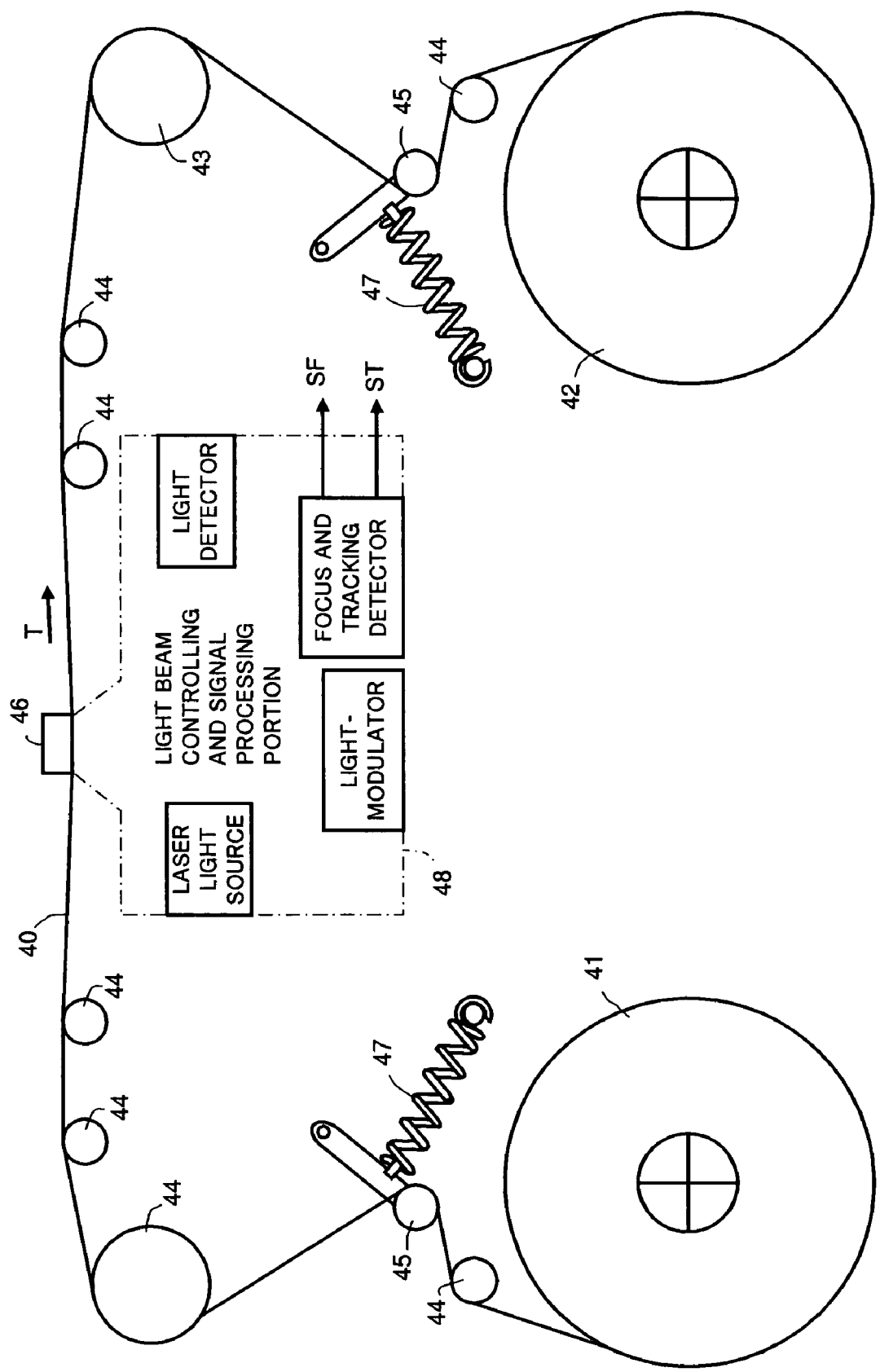
FIG. 5 is a schematic structural illustration showing an essential part of an embodiment of apparatus for driving a tape-shaped optical recording medium according to the invention claimed in any one of claims 1 to 11 of the present application.

FIG. 5 shows an essential part of an embodiment of apparatus for driving a tape-shaped optical recording medium according to the invention claimed in any one of claims 1 to 11 of the present application.

In the embodiment shown in FIG. 5, a supply reel 41 on which an optical tape 40 as an optical recording medium is wound to be derived therefrom and a take-up reel 42 onto which the optical tape 40 is wound are provided. The optical tape 40 between the supply reel 41 and the take-up reel 42 is driven by a friction capstan 43 to run in the direction indicated with an arrow T (the T direction) from the supply reel 41 to the take-up reel 42.

Further, in the embodiment shown in FIG. 5, a plurality of positioning members 44, a pair of tension regulators 45 and a running guide member 46 are provided for causing the optical tape 40 driven by the friction capstan 43 to run stably though a predetermined position. The positioning members 44 determine a running path for the optical tape 40 and tension regulators 45 are operative to provide the optical tape 40 between the supply reel 41 and the take-up reel 42 with predetermined tensile force brought about by springs 47. The running guide member 46 serves for guiding the optical tape 40 so that laser light beams obtained from a light beam controlling and signal processing portion 48 are incident upon the optical tape 40 on the running guide member 46.

Figure 6:
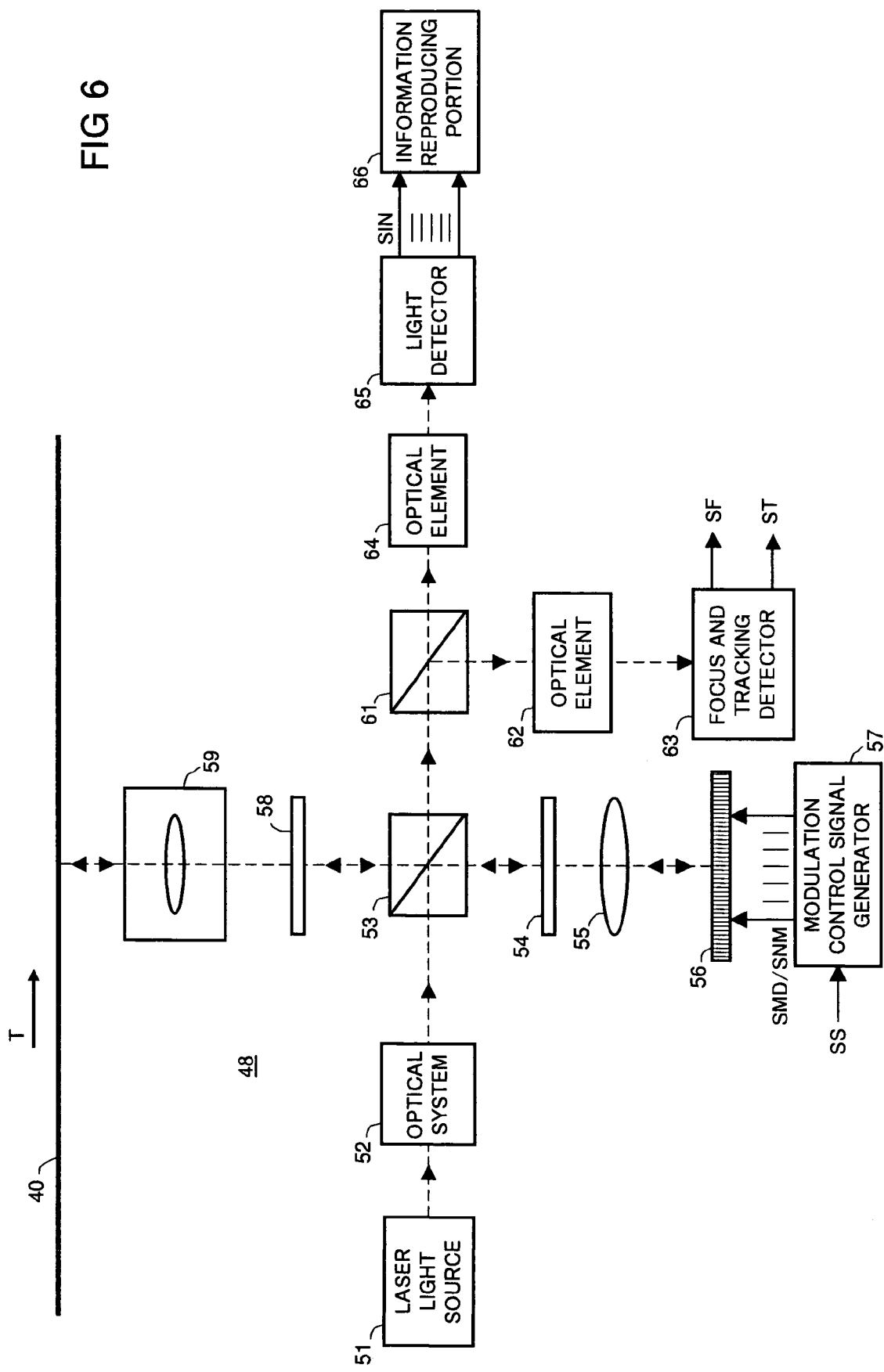
FIG. 6 is a schematic block diagram showing an example of an embodied structure of a light beam controlling and signal processing portion in the embodiment shown in FIG. 5.

The light beam controlling and signal processing portion 48 is embodied in structure a shown in FIG. 6, for example. In the embodied structure of the light beam controlling and signal processing portion 48 shown in FIG. 6, a laser light source 51 is provided for generating continuously, for example, a plurality of laser light beams. The laser light beams emitted from the laser light source 51 enter into an optical system 52 which contains, for example, a collimating lens, to be collimated thereby. The collimated laser light beams obtained from the optical system 52 enter into a polarized light beam splitter 53 and are reflected from the polarized light beam splitter 53 to be directed downward in FIG. 6 to pass through a quarter wavelength plate 54 and then enter into a converging lens 55. The converging lens 55 is operative to converge the collimated laser light beams having passed through the quarter wavelength plate 54 on a light-modulator 56.

The light-modulator 56 is constituted with, for example, a plurality of reflection type light-modulating elements which are arranged two-dimensionally. The laser light beams converged by the converging lens 55 come respectively to the reflection type light-modulating elements so arranged two-dimensionally as to form the two-dimensional light-modulator 56. A back surface of each of the reflection type light-modulating elements, which is opposites to an incident surface of the reflection type light-modulating element upon which one of the laser light beams is incident, forms a light reflector. Therefore, the laser light beam incident upon each of the reflection type light-modulating elements is reflected from the light reflector in the form of the back surface of the reflection type light-modulating element.

In relation to the two-dimensional light-modulator 56, a modulation control signal generator 57 is provided to be supplied with a signal SS representing information for recording. The modulation control signal generator 57 is operative to produce a plurality of modulation control signals SMD which correspond to the information for recording in response to the signal SS or to produce a plurality of modulation control signals SNM which are predetermined irrespectively of the signal SS and supply the reflection type light-modulating elements constituting the two-dimensional light-modulator 56 with the modulation control signals SMD or SNM, respectively.

When the modulation control signals SMD corresponding to the information for recording are supplied to the reflection type light-modulating elements constituting the two-dimensional light-modulator 56, each of the reflection type light-modulating elements is operative to modulate the laser light beam which is incident thereupon and reflected therefrom in response to the modulation control signals SMD. The modulation to which the laser light beam is thus subjected in the two-dimensional light-modulator 56 is carried out by varying the reflection amount of the laser light beam at each of the reflection type light-modulating elements in response to the modulation control signal SMD. On the other hand, when the modulation control signals SNM are supplied to the reflection type light-modulating elements constituting the two-dimensional light-modulator 56, each of the reflection type light-modulating elements is operative not to modulate the laser light beam which is incident thereupon to be reflected therefrom with substantially a constant reflection amount.

As a result of this, the laser light beams which are modulated in response to the modulation control signals SMD at and reflected from the reflection type light-modulating elements arranged two-dimensionally, respectively, or reflected respectively from the reflection type light-modulating elements arranged two-dimensionally without being modulated, are obtained from the two-dimensional light-modulator 56 to be directed to the converging lens 55.

The laser light beams obtained from the two-dimensional light-modulator 56 pass through the converging lens 55 and the quarter wavelength plate 54 to enter into the polarized light beam splitter 53. Since the laser light beams entering into the polarized light beam splitter 53 from the quarter wavelength plate 54 have passed through the quarter wavelength plate 54 twice in the direction to the converging lens 55 and in the opposite direction to the polarized light beam splitter 53, a plane of polarization of each of the laser light beams entering into the polarized light beam splitter 53 from the quarter wavelength plate 54 has been rotated by 90 degrees in comparison with that of each of the laser light beams entering into the polarized light beam splitter 53 from the optical system 52 and therefore the laser light beams entering into the polarized light beam splitter 53 from the quarter wavelength plate 54 pass through the polarized light beam splitter 53 without being reflected.

The laser light beams thus having passed through the polarized light beam splitter 53 further pass through a quarter wavelength plate 58 and a light beam control optical system 59 to be incident upon the optical tape 40. The light beam control optical system 59 is operative to subject each of the laser light beams passing through there to the optical tape 40 to focus control for focusing properly each of the laser light beams on the optical tape 40 and tracking control for causing each of the laser light beams to be incident upon a proper position on the optical tape 40.

When the laser light beams which have been modulated in response to the modulation control signals SMD at and reflected from the reflection type light-modulating elements constituting the light-modulator 56 are incident upon the optical tape 40, a plurality of recording tracks, on each of which the information for recording is recorded, are formed on the optical tape 40 along its moving direction by the laser light beams incident upon the optical tape 40. On the other hand, when the laser light beams which have been reflected without being modulated from the reflection type light-modulating elements constituting the light-modulator 56 are incident upon the optical tape 40, these laser light beams trace continuously the recording tracks formed on the optical tape 40 along its moving direction, respectively.

The laser light beams having been reflected without being modulated from the reflection type light-modulating elements constituting the light-modulator 56 and incident upon the optical tape 40 to trace continuously the recording tracks formed thereon, are modulated in response to the information recorded on the recording tracks formed on the optical tape 40 and simultaneously reflected from the optical tape 40 to be directed to the light beam control optical system 59. The laser light beams obtained from the optical tape 40 pass through the light beam control optical system 59 and the quarter wavelength plate 58 and then enter into the polarized light beam splitter 53. Since the laser light beams entering into the polarized light beam splitter 53 from the quarter wavelength plate 58 have passed through the quarter wavelength plate 58 twice in the direction to the light beam control optical system 59 and in the opposite direction to the polarized light beam splitter 53, a plane of polarization of each of the laser light beams entering into the polarized light beam splitter 53 from the quarter wavelength plate 58 has been rotated by 90 degrees in comparison with that of each of the laser light beams entering into the polarized light beam splitter 53 from the quarter wavelength plate 54 and therefore the laser light beams entering into the polarized light beam splitter 53 from the quarter wavelength plate 58 are reflected from the polarized light beam splitter 53 to be directed to the right in FIG. 6.

The laser light beams reflected to the right in FIG. 6 from the polarized light beam splitter 53 enter into a light beam splitter 61. A part of each of the laser light beams having entered into the light beam splitter 61 is reflected from the light beam splitter 61 to be directed downward in FIG. 6 to pass through an optical element 62, such as a cylindrical lens or the like, and then enters into a focus and tracking detector 63 and another part of each of the laser light beams having entered into the light beam splitter 61 passes through the light beam splitter 61 further to pass through an optical element 64, such as a converging lens or the like, and then enters into a light detector 65.

The focus and tracking detector 63 is operative to produce output signals SF and ST which represent respectively the focus condition and the tracking condition of the laser light beams incident upon the optical tape 40 in response to the laser light beams incident upon the focus and tracking detector 63 through the optical element 62.

The output signals SF and ST thus obtained from the focus and tracking detector 63 are used for focus control and tracking control to which each of the laser light beams to be incident upon the optical tape 40 is subjected in the light beam control optical system 59.

The light detector 65 is operative to produce a plurality of output signals SIN which vary in response to variations in each of the laser light beams incident upon the light detector 65 through the optical element 64 and supply an information reproducing portion 66 with the output signals SIN. The information reproducing portion 66 is operative to reproduce the information recorded on the optical tape 40 based on the output signals SIN obtained from the light detector 65.

Figure 7:
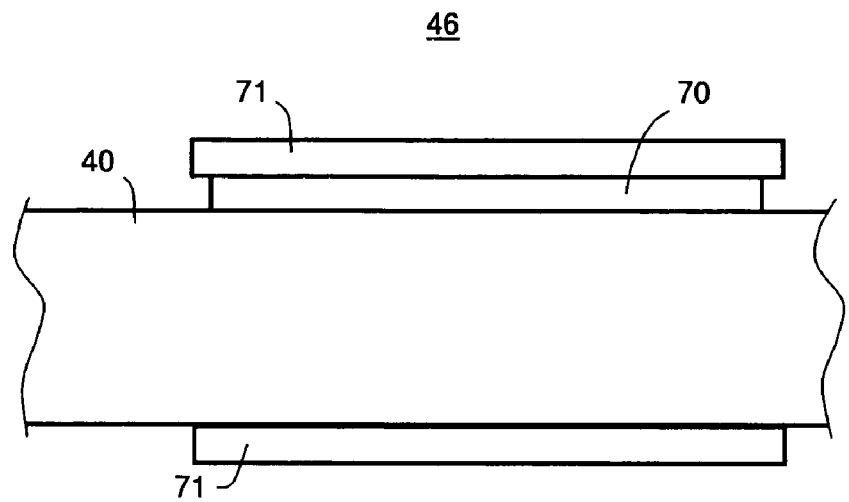
FIG. 7 is a schematic side view used for explaining a running guide member in the embodiment shown in FIG. 5.

As shown in FIG. 7, the running guide member 46 has a guide face portion 70 facing to the optical tape 40 and a flange portion 71 for restricting the position of the optical tape 40 running thought the guide face portion 70. The guide face portion 70 is formed with a flat portion of the running guide member 46, as shown in FIG. 8, and the laser light beams emanating from the light beam controlling and signal processing portion 48 are incident upon the optical tape 40 on the flat portion of the running guide member 46 forming the guide face portion 70.

Figure 8:
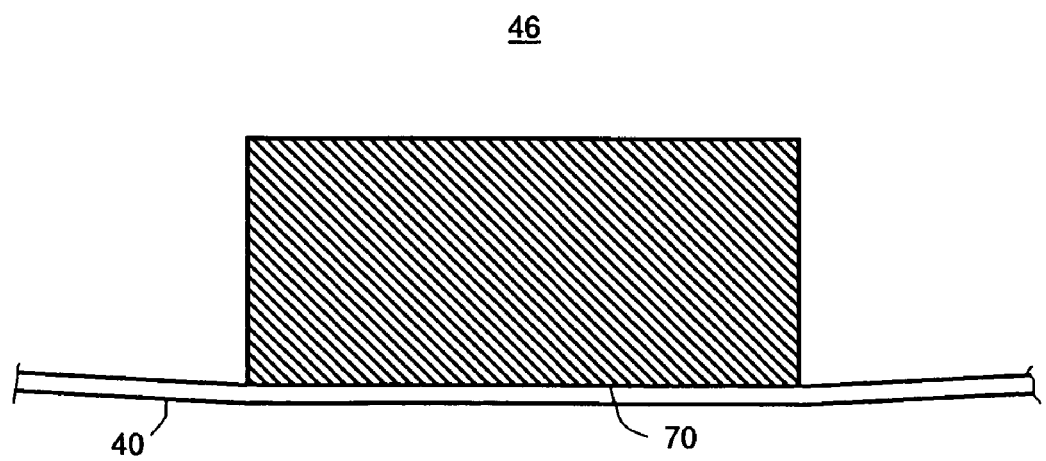
FIG. 8 is a schematic cross-sectional view used for explaining the running guide member in the embodiment shown in FIG. 5.
Figure 9:
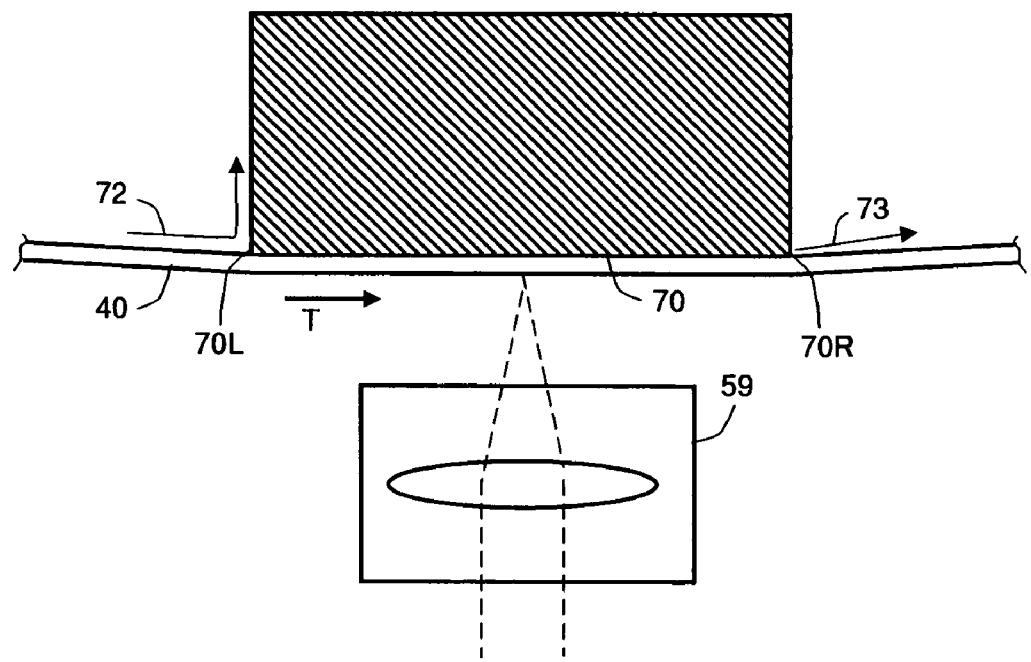
FIG. 9 is a schematic cross-sectional view used for explaining a first example of the running guide member in the embodiment shown in FIG. 5.
Figure 10:
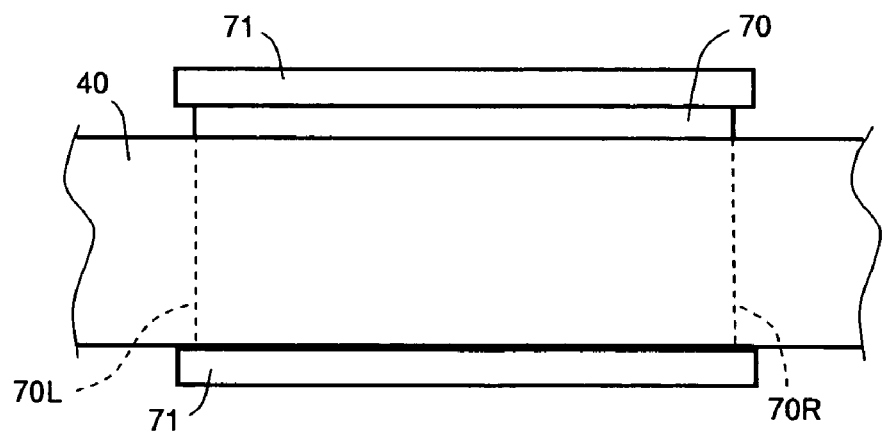
FIG. 10 is a schematic side view used for explaining the first example of the running guide member in the embodiment shown in FIG. 5.

In a first example of the running guide member 46 having the flat portion which forms the guide face portion 70 facing to the optical tape 40, as shown in FIGS. 7 and 8, the optical tape 40 runs along the flat portion of the running guide member 46 forming the guide face portion 70, in such a manner as shown in FIGS. 9 and 10. As shown in FIG. 9, for example, the running guide member 46 and the light beam control optical system 59 in the light beam controlling and signal processing portion 48 are positioned to be opposite to each other with the optical tape 40 between them and the laser light beams having passed through the light beam control optical system 59 are incident directly upon the optical tape 40 on the flat portion of the running guide member 46 forming the guide face portion 70.

When the optical tape 40 is driven to run in the T direction to the right edge 70R of the guide face portion 70 from the left edge 70L of the guide face portion 70 in FIGS. 9 and 10, an air flow going away from the optical tape 40 arises at the left edge 70L of the guide face portion 70 in accordance with the movement of the optical tape 40, as shown with an arrow 72 in FIG. 9, so that air flowing onto the guide face portion 70 with the optical tape 40 running in the T direction is reduced, and to the contrary, air flowing out from the guide face portion 70 at the right edge 70R of the guide face portion 70 with the optical tape 40 running in the T direction, as shown with an arrow 73 in FIG. 9, is increased. Consequently, a negative pressure is induced on the flat portion of the running guide member 46 forming the guide face portion 70 and thereby a space between the guide face portion 70 and the optical tape 40 is constantly and stably maintained to be extremely small, for example, 10 to 100 nm over a relatively wide area on the guide face portion 70 except portions in the vicinity of the right and left edges 70R and 70L thereof.

Accordingly, with the running guide member 46 having the flat portion which forms the guide face portion 70 facing to the optical tape 40 and on which the laser light beams having passed through the light beam control optical system 59 in the light beam controlling and signal processing portion 48 are incident upon the optical tape 40, as described above, an area on the guide face portion 70 where an incident position on the optical tape 40 of each of the laser light beams having passed through the light beam control optical system 59 in the light beam controlling and signal processing portion 48 is fixed invariably is stably maintained to be relatively wide.

As a result, when the laser light beams having passed through the light beam control optical system 59 in the light beam controlling and signal processing portion 48 are incident upon the optical tape 40 on the flat portion of the running guide member 46 forming the guide face portion 70, a focus servo control for the laser light beams incident upon the optical tape 40 which requires an undesirable high speed control in response to the running of the optical tape 40 can be unnecessary.

Incidentally, even in the condition as mentioned above, it is feared that the focus condition of the laser light beams incident upon the optical tape 40 is undesirably varied under the influence of, for example, dispersions in manufacturing of various portions including the running guide member 46 of the embodiment shown in FIG. 5 or variations in temperature and aged deterioration in the embodiment shown in FIG. 5. Accordingly, it is desired to take a measure to providing a focus controller operative for the laser light beams incident upon the optical tape 40 to absorb such variations in the focus condition of the laser light beams incident upon the optical tape 40 as mentioned above so as to work as occasion demands whenever a power switch of the embodiment shown in FIG. 5 is turned on.

Figure 11:
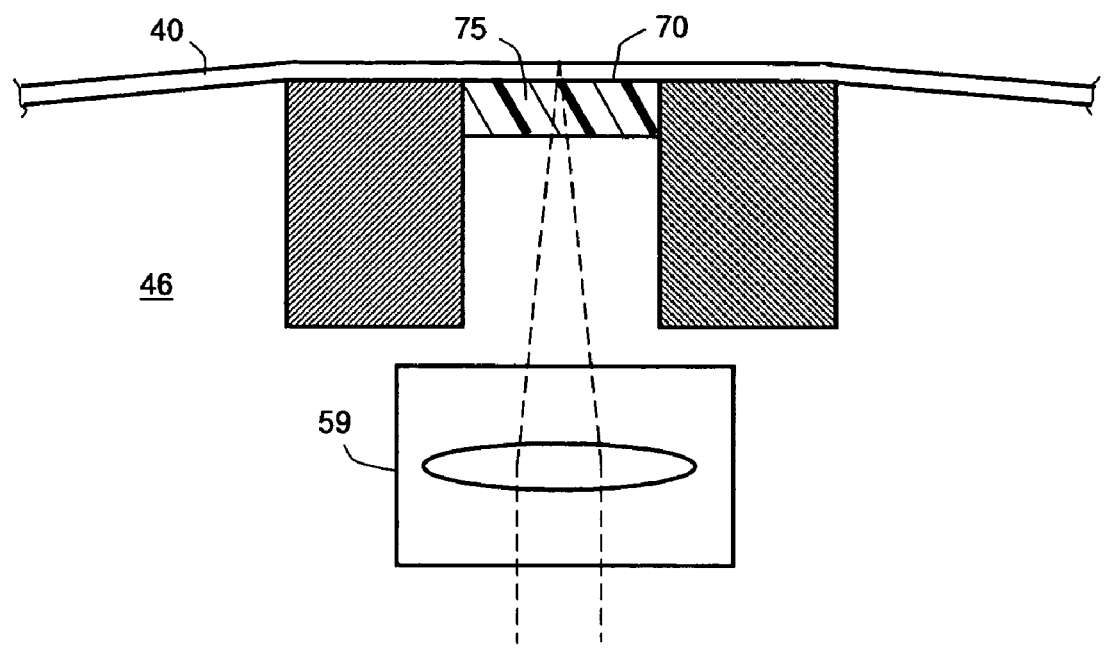
FIG. 11 is a schematic cross-sectional view used for explaining a second example of the running guide member in the embodiment shown in FIG. 5.
Figure 12:
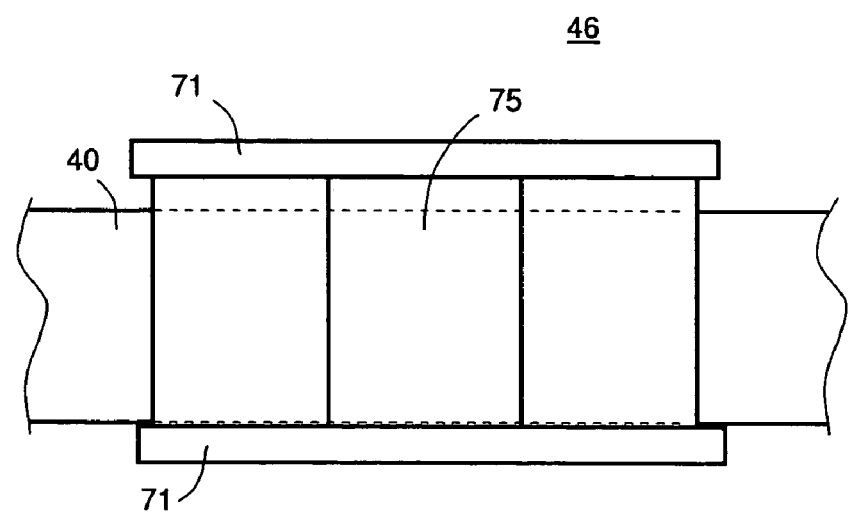
FIG. 12 is a schematic side view used for explaining the second example of the running guide member in the embodiment shown in FIG. 5.

FIGS. 11 and 12 show a second example of the running guide member 46 provided in the embodiment shown in FIG. 5.

In the second example of the running guide member 46 shown in FIGS. 11 and 12, a part, for example, a central part of the flat portion forming the guide face portion 70 is formed into a light transmittable portion 75 constituted with glass or the like. This second example of the running guide member 46 having the light transmittable portion 75 is positioned between the optical tape 40 and the light beam control optical system 59 in the light beam controlling and signal processing portion 48 shown in FIG. 5 and the laser light beams having passed through the light beam control optical system 59 further pass through the light transmittable portion 75 to be incident upon the optical tape 40.

Figure 13:
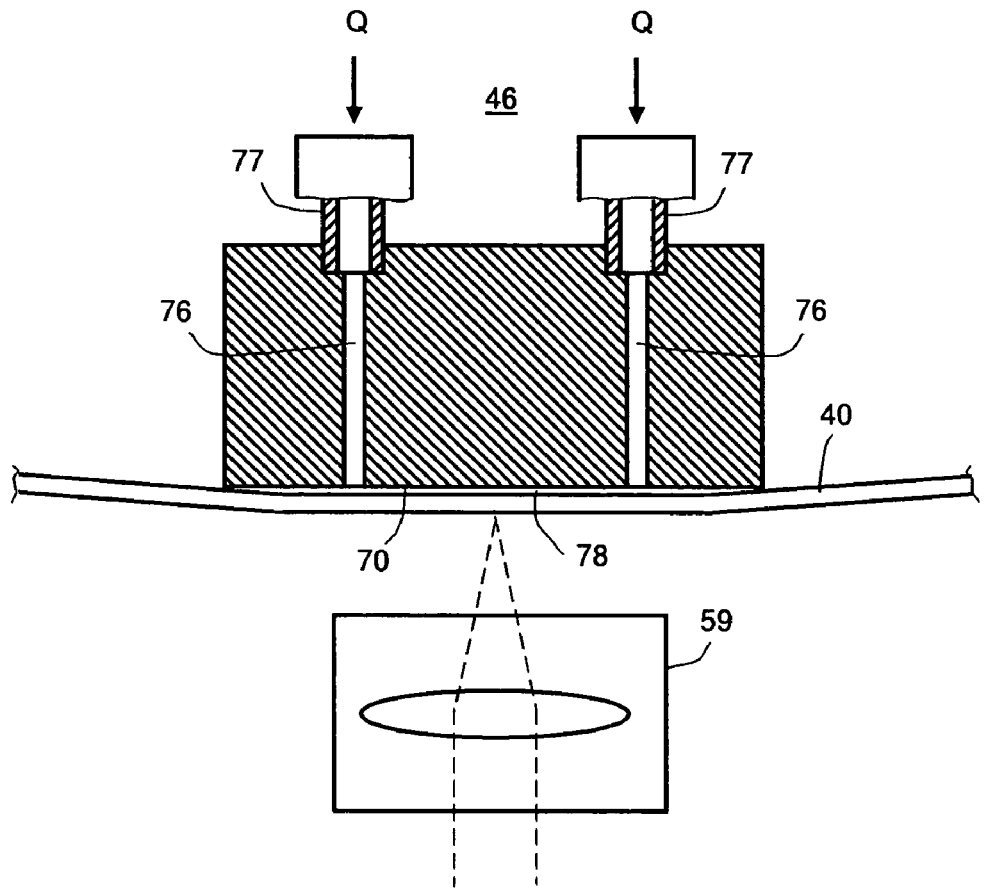
FIG. 13 is a schematic cross-sectional view used for explaining a third example of the running guide member in the embodiment shown in FIG. 5.
Figure 14:
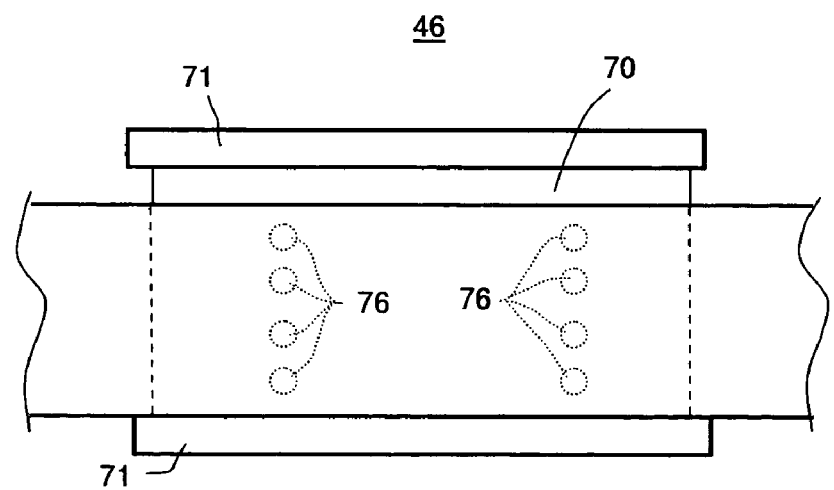
FIG. 14 is a schematic side view used for explaining the third example of the running guide member in the embodiment shown in FIG. 5.

FIGS. 13 and 14 show a third example of the running guide member 46 provided in the embodiment shown in FIG. 5.

As shown in FIG. 13, for example, the third example of the running guide member 46 shown in FIGS. 13 and 14 and the light beam control optical system 59 in the light beam controlling and signal processing portion 48 are positioned to be opposite to each other with the optical tape 40 between them and the laser light beams having passed through the light beam control optical system 59 are incident directly upon the optical tape 40 on the flat portion of the running guide member 46 forming the guide face portion 70.

This third example of the running guide member 46 is provided with a plurality of through holes 76, each of which has one opening end on the flat portion forming the guide face portion 70. Each of the through holes 76 is supplied through a nozzle 77 provided at the other opening end of each of the through holes 76 with compressed air Q, as shown in FIG. 13. The pressure by the compressed air 0 supplied to the through holes 76 acts on the optical tape 40 running through the flat portion forming the guide face portion 70 so that a space 78 is formed between the optical tape 40 and the flat portion forming the guide face portion 70 facing to the optical tape 40, as shown in FIG. 13.

Figure 15:
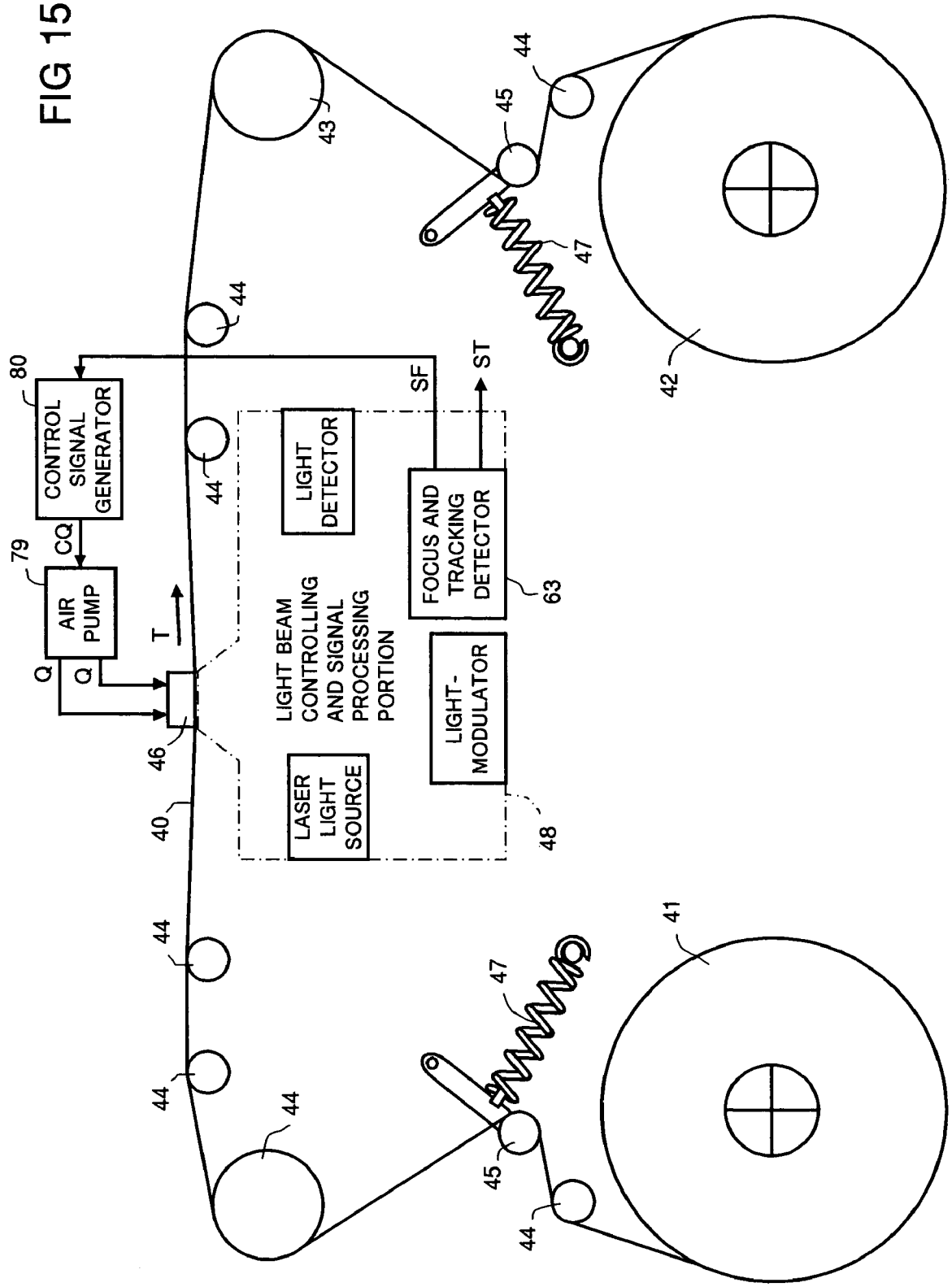
FIG. 15 is a schematic block diagram showing a light beam controlling and signal processing portion used together with the third example of the running guide member in the embodiment shown in FIG. 5.

The supply of the compressed air 0 to the through holes 76 is carried out by an air pump 79 as shown in FIG. 15 and the operation of the air pump 79 is controlled by a pump control signal CQ supplied to the air pump 79 from a control signal generator 80. The output signal SF representing the focus condition of the laser light beams incident upon the optical tape 40, which is obtained, together with the output signal ST representing the tracking condition of the laser light beams incident upon the optical tape 40, from the focus and tracking detector 63 in the light beam controlling and signal processing portion 48, is supplied to the control signal generator 80, as shown in FIG. 15.

The control signal generator 80 is operative to produce the pump control signal CQ varying in response to variations in the output signal SF from the focus and tracking detector 63 and supply the air pump 79 with the pump control signal CQ. Therefore, the compressed air Q supplied to the through holes 76 from the air pump 79 is controlled by the output signal SF representing the focus condition of the laser light beams incident upon the optical tape 40 and obtained from the focus and tracking detector 63 in the light beam controlling and signal processing portion 48.

Consequently, the pressure by the compressed air Q acting on the optical tape 40 running through the flat portion forming the guide face portion 70 is controlled in response to the focus condition of the laser light beams incident upon the optical tape 40 and, as a result, the space 78 formed between the optical tape 40 and the flat portion forming the guide face portion 70 facing to the optical tape 40 as shown in FIG. 13 is adjusted in response to the focus condition of the laser light beams incident upon the optical tape 40, so that the focus condition of the laser light beams incident upon the optical tape 40 is appropriately maintained.

Figure 16:
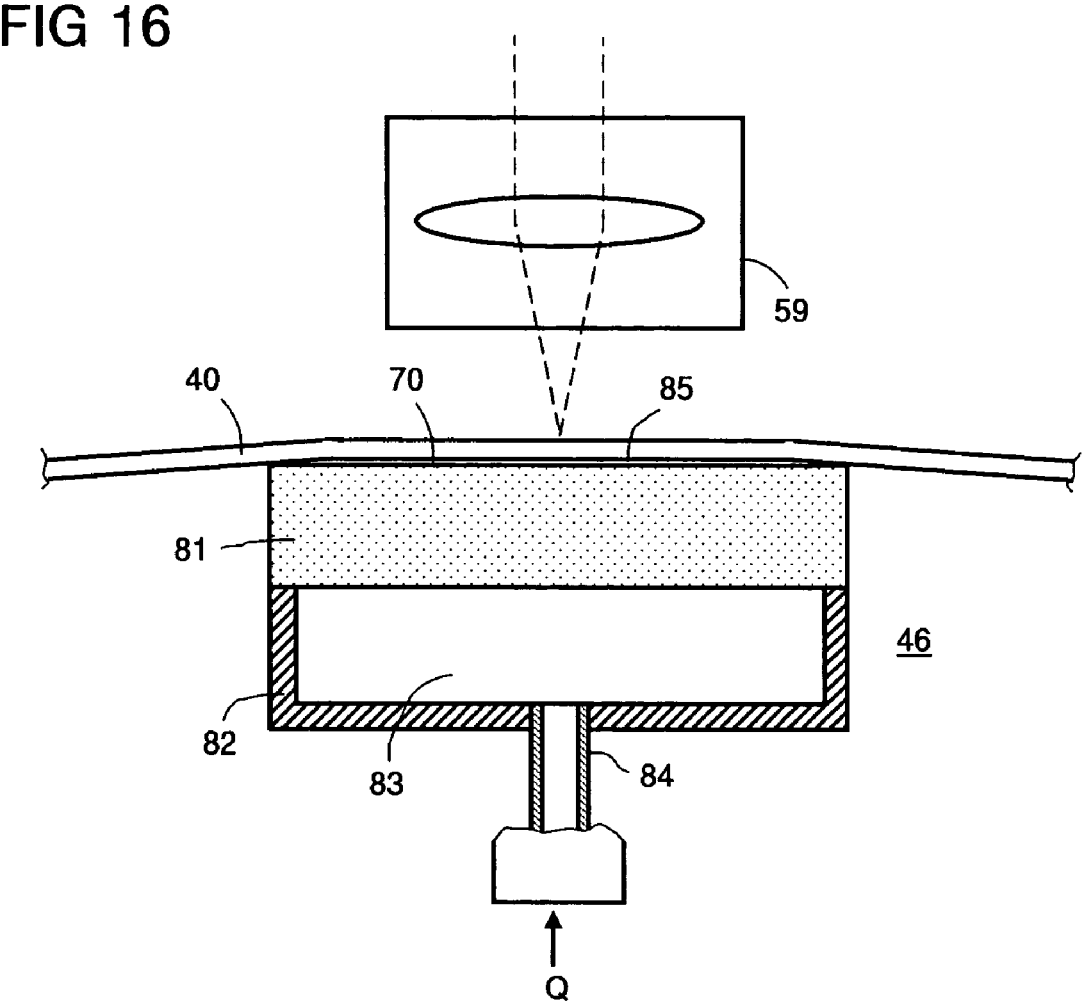
FIG. 16 is a schematic cross-sectional view used for explaining a fourth example of the running guide member in the embodiment shown in FIG. 5.
Figure 17:
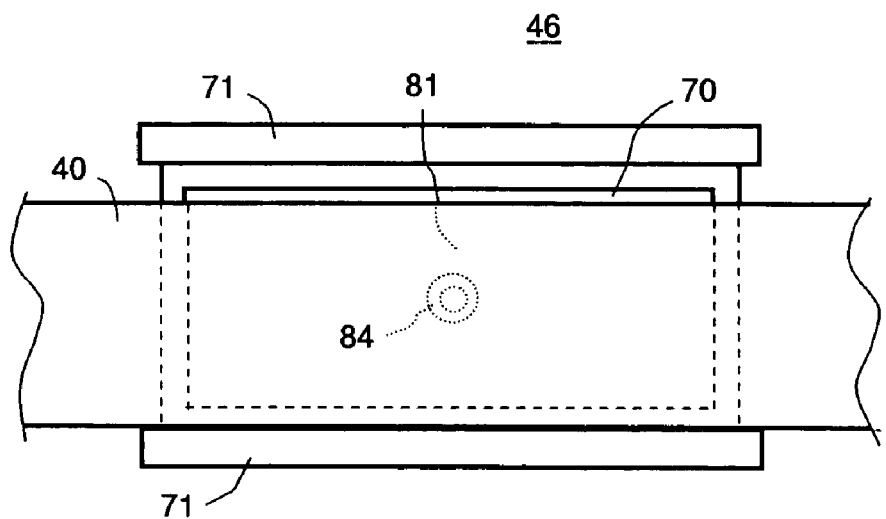
FIG. 17 is a schematic side view used for explaining the fourth example of the running guide member in the embodiment shown in FIG. 5.

FIGS. 16 and 17 show a fourth example of the running guide member 46 provided in the embodiment shown in FIG. 5.

As shown in FIG. 16, for example, the fourth example of the running guide member 46 shown in FIGS. 16 and 17 and the light beam control optical system 59 in the light beam controlling and signal processing portion 48 shown in FIG. 5 are also positioned to be opposite to each other with the optical tape 40 between them and the laser light beams having passed through the light beam control optical system 59 are incident directly upon the optical tape 40 on the flat portion of the running guide member 46 forming the guide face portion 70.

In this fourth example of the running guide member 46, the flat portion forming the guide face portion 70 is constituted with a porous material member 81. An air chamber forming portion 82 is provided at the side of the back surface of the porous material member 81 opposite to the front surface of the porous material member 81 facing to the optical tape 40 and compressed air a is supplied through a nozzle 84 to an air chamber 83 in the air chamber forming portion 82. The pressure by the compressed air Q supplied to the air chamber 83 acts through the porous material member 81 on the optical tape 40 running through the flat portion forming the guide face portion 70 so that a space 85 is formed between the optical tape 40 and the flat portion forming the guide face portion 70 facing to the optical tape 40, as shown in FIG. 16.

The controlled supply of the compressed air Q to the air chamber 83 through the nozzle 84 is carried out in the same manner as that of the compressed air Q to the through holes 76 in the third example of the running guide member 46 shown in FIGS. 13 and 14. Consequently, the space 85 formed between the optical tape 40 and the flat portion forming the guide face portion 70 facing to the optical tape 40 as shown in FIG. 16 is adjusted in response to the focus condition of the laser light beams having passed through the light beam control optical system 59 in the light beam controlling and signal processing portion 48 shown in FIG. 5 to be incident upon the optical tape 40, so that the focus condition of the laser light beams incident upon the optical tape 40 is appropriately maintained.

Figure 18:
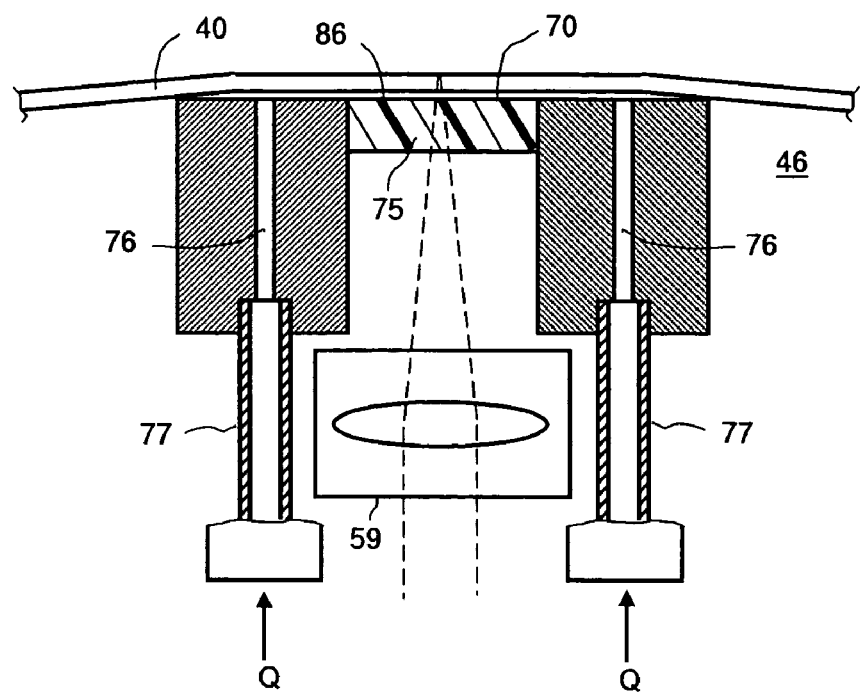
FIG. 18 is a schematic cross-sectional view used for explaining a fifth example of the running guide member in the embodiment shown in FIG. 5.
Figure 19:
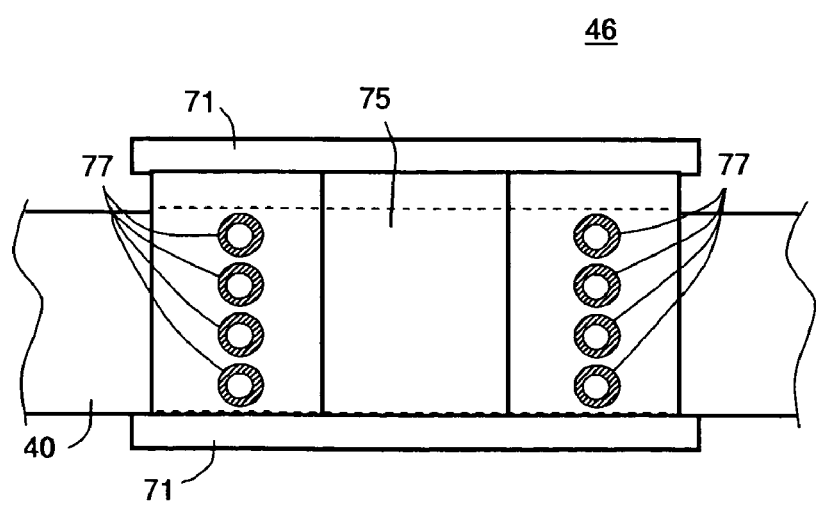
FIG. 19 is a schematic side view used for explaining the fifth example of the running guide member in the embodiment shown in FIG. 5.

FIGS. 18 and 19 show a fifth example of the running guide member 46 provided in the embodiment shown in FIG. 5.

In the fifth example of the running guide member 46 shown in FIGS. 18 and 19, a part, for example, a central part of the flat portion forming the guide face portion 70 is formed into a light transmittable portion 75 constituted with glass or the like. Further, the fifth example of the running guide member 46, which has the light transmittable portion 75 at the central part of the flat portion forming the guide face portion 70, is provided with a plurality of through holes 76, each of which has one opening end on the flat portion forming the guide face portion 70. Each of the through holes 76 is supplied through a nozzle 77 provided at the other opening end of each of the through holes 76 with compressed air Q, as shown in FIG. 18. The pressure by the compressed air Q supplied to the through holes 76 acts on the optical tape 40 running through the flat portion forming the guide face portion 70 so that a space 86 is formed between the optical tape 40 and the flat portion forming the guide face portion 70 facing to the optical tape 40, as shown in FIG. 18.

The controlled supply of the compressed air Q to the through holes 76 through the nozzle 77 is carried out in the same manner as that of the compressed air Q to the through holes 76 in the third example of the running guide member 46 shown in FIGS. 13 and 14. Consequently, the space 86 formed between the optical tape 40 and the flat portion forming the guide face portion 70 facing to the optical tape 40 as shown in FIG. 18 is adjusted in response to the focus condition of the laser light beams having passed through the light beam control optical system 59 in the light beam controlling and signal processing portion 48 shown in FIG. 5 to be incident upon the optical tape 40, so that the focus condition of the laser light beams incident upon the optical tape 40 is appropriately maintained.

The fifth example of the running guide member 46 thus having the light transmittable portion 75 at the central part of the flat portion forming the guide face portion 70 is positioned between the optical tape 40 and the light beam control optical system 59 in the light beam controlling and signal processing portion 48 shown in FIG. 5 and the laser light beams having passed through the light beam control optical system 59 further pass through the light transmittable portion 75 to be incident upon the optical tape 40.

Figure 20:
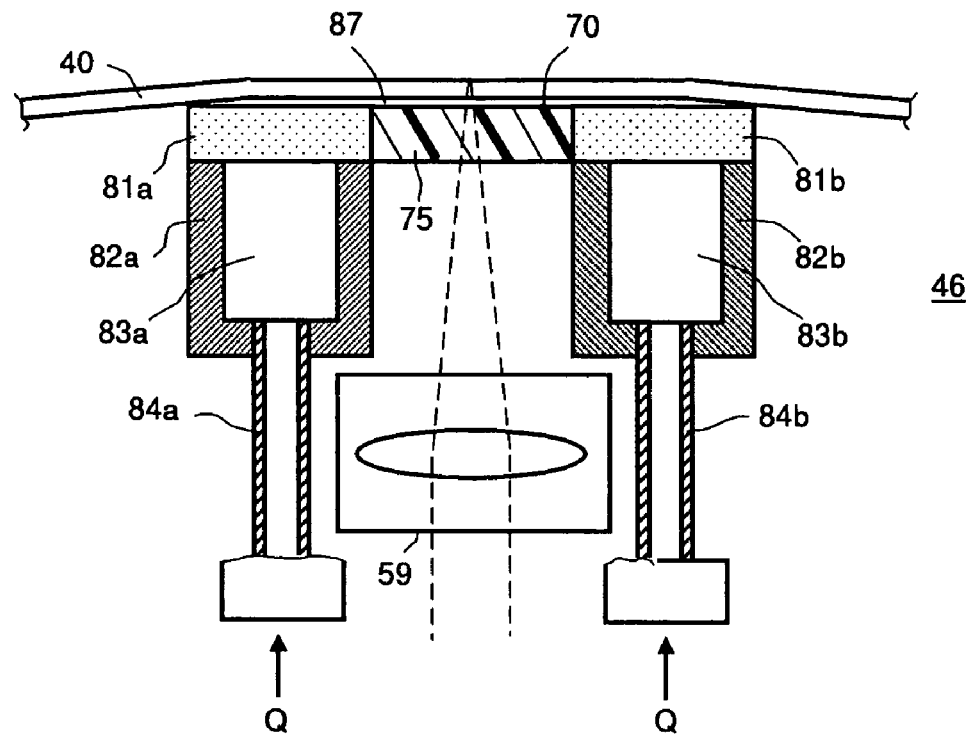
FIG. 20 is a schematic cross-sectional view used for explaining a sixth example of the running guide member in the embodiment shown in FIG. 5.
Figure 21:
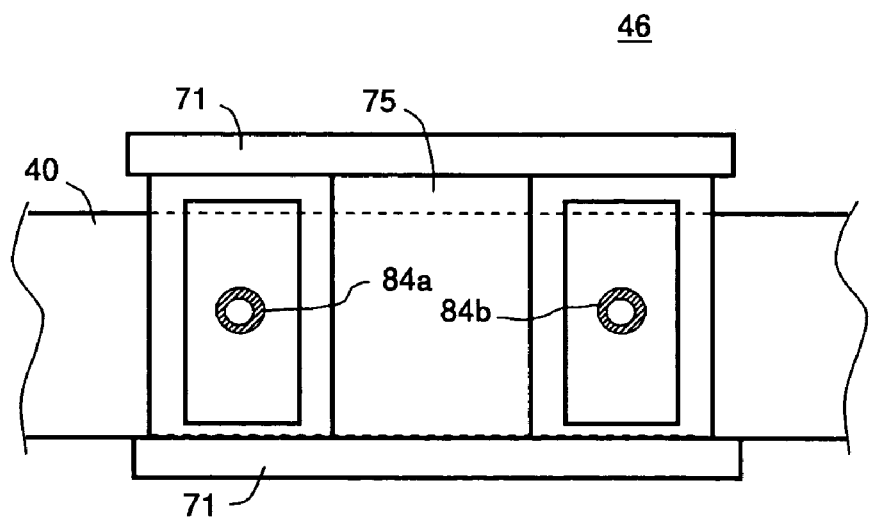
FIG. 21 is a schematic side view used for explaining the sixth example of the running guide member in the embodiment shown in FIG. 5.

FIGS. 20 and 21 show a sixth example of the running guide member 46 provided in the embodiment shown in FIG. 5.

In the sixth example of the running guide member 46 shown in FIGS. 20 and 21, a part, for example, a central part of the flat portion forming the guide face portion 70 is formed into a light transmittable portion 75 constituted with glass or the like. Further, in this sixth example of the running guide member 46 which has the light transmittable portion 75 at the central part of the flat portion forming the guide face portion 70, both side parts of the flat portion forming the guide face portion 70, between which the light transmittable portion 75 is provided, are constituted with porous material members 81a and 81b, respectively.

An air chamber forming portion 82a is provided at the side of the back surface of the porous material member 81 opposite to the front surface of the porous material member 81 facing to the optical tape 40 and compressed air Q is supplied through a nozzle 84a to an air chamber 83a in the air chamber forming portion 82a. Similarly, an air chamber forming portion 82b is provided at the side of the back surface of the porous material member 81b opposite to the front surface of the porous material member 81b facing to the optical tape 40 and compressed air Q is supplied through a nozzle 84b to an air chamber 83b in the air chamber forming portion 82b.

The pressure by the compressed air Q supplied to the air chambers 83a and 82b acts through the porous material members 81a and 81b on the optical tape 40 running through the flat portion forming the guide face portion 70 so that a space 87 is formed between the optical tape 40 and the flat portion forming the guide face portion 70 facing to the optical tape 40, as shown in FIG. 20.

Each of the controlled supply of the compressed air Q to the air chamber 83a in the air chamber forming portion 82a through the nozzle 84a and the controlled supply of the compressed air Q to the air chamber 83b in the air chamber forming portion 82b through the nozzle 84b is carried out in the same manner as that of the compressed air Q to the through holes 76 in the third example of the running guide member 46 shown in FIGS. 13 and 14. Consequently, the space 87 formed between the optical tape 40 and the flat portion forming the guide face portion 70 facing to the optical tape 40 as shown in FIG. 20 is adjusted in response to the focus condition of the laser light beams having passed through the light beam control optical system 59 in the light beam controlling and signal processing portion 48 shown in FIG. 5 to be incident upon the optical tape 40, so that the focus condition of the laser light beams incident upon the optical tape 40 is appropriately maintained.

The sixth example of the running guide member 46 thus having the light transmittable portion 75 at the central part of the flat portion forming the guide face portion 70 is positioned between the optical tape 40 and the light beam control optical system 59 in the light beam controlling and signal processing portion 48 shown in FIG. 5 and the laser light beams having passed through the light beam control optical system 59 further pass through the light transmittable portion 75 to be incident upon the optical tape 40.

With each of the second to sixth examples of the running guide member 46 shown in FIGS. 11 to 21, the advantages brought about by the flat portion of the running guide member 46 which forms the guide face portion 70 facing to the optical tape 40 and on which the laser light beams having passed through the light beam control optical system 59 in the light beam controlling and signal processing portion 48 are incident upon the optical tape 40, are also obtained in the same manner as those obtained with the first example of the running guide member 46 shown in FIGS. 9 and 10.

APPLICABILITY FOR INDUSTRIAL USE

As apparent from the above description, in the apparatus for driving a tape-shaped optical recording medium according to the invention claimed in any one of claims 1 to 11 of the present application, since the guide face portion for facing to the tape-shaped optical recording medium is formed with the flat portion of the running guide means for guiding the tape-shaped optical recording medium running between the reel means, a space between the tape-shaped optical recording medium and the guide face portion is stably and continuously maintained to be very small over a relatively wide area on the flat portion of the running guide means.

Consequently, with the apparatus for driving a tape-shaped optical recording medium according to the invention claimed in any one of claims 1 to 11 of the present application, when a light beam obtained from a light beam controlling and signal processing portion is incident upon the tape-shaped optical recording medium running between the reel means on the flat portion of the running guide means, an area on the guide face portion where an incident position on the tape-shaped optical recording medium of the light beam obtained from the light beam controlling and signal processing portion is fixed invariably can be stably maintained to be relatively wide. Further, as a result, when the light beam obtained from the light beam controlling and signal processing portion is incident upon the tape-shaped optical recording medium running between the reel means on the flat portion of the running guide means, a focus servo control for the light beam which requires an undesirable high speed control in response to the running of the tape-shaped optical recording medium can be unnecessary.

The invention claimed is:

1. An apparatus for driving a tape-shaped optical recording medium comprising;
   a pair of reel means for supplying with a tape-shaped optical recording medium and for taking-up the tape-shaped optical recording medium;
   driving means for causing the tape-shaped optical recording medium to run from one of said reel means to the other of said reel means; and
   running guide means for guiding the tape-shaped optical recording medium running between said reel means,
      wherein said running guide means has a flat portion forming a guide face portion for facing to the tape-shaped optical recording medium and is operative to cause the tape-shaped optical recording medium to run along the flat portion, and
      wherein said running guide means is provided with a light transmittable portion constituting a part of the flat portion thereof and positioned between the tape-shaped optical recording medium and optical means for causing a light beam to be incident upon the tape-shaped optical recording medium so that said light beam is incident upon the tape-shaped optical recording medium through said light transmittable portion.

2. An apparatus for driving a tape-shaped optical recording medium comprising;
   a pair of reel means for supplying with a tape-shaped optical recording medium and for taking-up the tape-shaped optical recording medium;
   driving means for causing the tape-shaped optical recording medium to run from one of said reel means to the other of said reel means; and
   running guide means for guiding the tape-shaped optical recording medium running between said reel means,
      wherein said running guide means has a flat portion forming a guide face portion for facing to the tape-shaped optical recording medium and is operative to cause the tape-shaped optical recording medium to run along the flat portion,
         wherein said running guide means is provided with a through hole having an opening end thereof on the flat portion of said running guide means and gas pressure supplying means is provided for causing gas pressure to act on the tape-shaped optical recording medium running along said flat portion through said through hole.

3. An apparatus for driving a tape-shaped optical recording medium according to claim 2, wherein said running guide means and optical means for causing a light beam to be incident upon the tape-shaped optical recording medium are positioned to be opposite to each other with the tape-shaped optical recording medium between said running guide means and said optical means and said light beam is incident upon the tape-shaped optical recording medium on the flat portion of said running guide means.

4. An apparatus for driving a tape-shaped optical recording medium according to claim 2, wherein said running guide means is provided with a light transmittable portion constituting a part of the flat portion thereof and positioned between the tape-shaped optical recording medium and optical means for causing a light beam to be incident upon the tape-shaped optical recording medium so that said light beam is incident upon the tape-shaped optical recording medium through said light transmittable portion.

5. An apparatus for driving a tape-shaped optical recording medium according to claim 2, wherein said gas pressure supplying means includes gas pressure controlling means for controlling the gas pressure acting on the tape-shaped optical recording medium running along the flat portion of said running guide means through the through hole having the opening end thereof on said flat portion so as to adjust a space between the tape-shaped optical recording medium and the flat portion of said running guide means.

6. An apparatus for driving a tape-shaped optical recording medium comprising;
 a pair of reel means for supplying with a tape-shaped optical recording medium and for taking-up the tape-shaped optical recording medium;
 driving means for causing the tape-shaped optical recording medium to run from one of said reel means to the other of said reel means; and
 running guide means for guiding the tape-shaped optical recording medium running between said reel means,
 wherein said running guide means has a flat portion forming a guide face portion for facing to the tape-shaped optical recording medium and is operative to cause the tape-shaped optical recording medium to run along the flat portion,
 wherein said flat portion of the running guide means is constituted with a porous material member and gas pressure supplying means is provided for causing gas pressure to act on the tape-shaped optical recording medium running along said flat portion through said porous material member.

7. An apparatus for driving a tape-shaped optical recording medium according to claim 6, wherein said running guide means and optical means for causing a light beam to be incident upon the tape-shaped optical recording medium are positioned to be opposite to each other with the tape-shaped optical recording medium between said running guide means and said optical means and said light beam is incident upon the tape-shaped optical recording medium on the flat portion of said running guide means.

8. An apparatus for driving a tape-shaped optical recording medium according to claim 6, wherein said running guide means is provided with a light transmittable portion constituting a part of the flat portion thereof and positioned between the tape-shaped optical recording medium and optical means for causing a light beam to be incident upon the tape-shaped optical recording medium so that said light beam is incident upon the tape-shaped optical recording medium through said light transmittable portion.

9. An apparatus for driving a tape-shaped optical recording medium according to claim 6, wherein said gas pressure supplying means includes gas pressure controlling means for controlling the gas pressure acting on the tape-shaped optical recording medium running along the flat portion of said running guide means through said porous material member constituting said flat portion so as to adjust a space between the tape-shaped optical recording medium and said flat portion.

* * * * *